US012631569B2

(12) United States Patent
Shao et al.

(10) Patent No.: US 12,631,569 B2
(45) Date of Patent: May 19, 2026

(54) METHOD, DEVICE, SYSTEM AND COMPUTER READABLE MEDIUM FOR RAPIDLY DETECTING PEST EGG IN GRAIN BASED ON PEST EGG AND PEST HOLE STRUCTURE FEATURES

(71) Applicant: Nanjing University of Finance & Economics, Nanjing (CN)

(72) Inventors: Xiaolong Shao, Nanjing (CN); Xiaojing Yang, Nanjing (CN)

(73) Assignee: NANJING UNIVERSITY OF FINANCE & ECONOMICS, Nanjing (CN)

( * ) Notice: Subject to any disclaimer, the term of this patent is extended or adjusted under 35 U.S.C. 154(b) by 575 days.

(21) Appl. No.: 18/116,658

(22) Filed: Mar. 2, 2023

(65) Prior Publication Data

US 2024/0003828 A1 Jan. 4, 2024

(30) Foreign Application Priority Data

Jul. 3, 2022 (CN) .......................... 202210775843.3

(51) Int. Cl.
*G01N 21/956* (2006.01)
*G01N 21/88* (2006.01)

(52) U.S. Cl.
CPC ... *G01N 21/95692* (2013.01); *G01N 21/8851* (2013.01); *G01N 2021/8887* (2013.01)

(58) Field of Classification Search
CPC ......... G01N 21/95692; G01N 21/8851; G01N 2021/8887; G01N 23/046;

(Continued)

(56) References Cited

U.S. PATENT DOCUMENTS 8,391,550 B2 * 3/2013 Pachys ............... G01N 33/0098
382/110
2017/0231240 A1 * 8/2017 Jian ......................... A23B 9/04
374/45
2023/0196543 A1 * 6/2023 Ishihara ............. G01N 21/6456
382/110

OTHER PUBLICATIONS

L. Zhou, M. Fang, X.-z. Wang, M. Yi and Z.-w. Yu, "Application of Grey Relation Analysis in Image's Edge Detection of Pests in Stored Grain," 2008 International Symposium on Intelligent Information Technology Application Workshops, Shanghai, China, 2008, pp. 405-407 (Year: 2008).*

(Continued)

*Primary Examiner* — Kathleen Y Dulaney
(74) *Attorney, Agent, or Firm* — Timothy W. Menasco, Esq.; Harter Secrest & Emery LLP

(57) ABSTRACT

A method, device, system and computer-readable medium for rapidly detecting a pest egg in a grain based on a pest egg structure feature and a pest hole structure feature is disclosed. The detecting method includes acquiring a gray digital image of a grain pile and three-dimensionally reconstructing it to obtain a three-dimensional image of a multi-grain pile; segmenting the three-dimensional image of the multi-grain pile to obtain one or more grains-contained unit images; identifying pest hole areas in each of one or more grains-contained unit images based on a biological feature of a pest; determining whether the pest hole area is a pest egg area based on the pest hole structure feature; and determining whether an alive pest egg exists in the pest egg area based on a geometric feature and a physical feature of the pest egg.

19 Claims, 6 Drawing Sheets

(58) Field of Classification Search
CPC . G06T 2207/10081; G06T 2207/30128; G06T
2207/30188; G06T 7/0004; G06V 20/188;
G06V 10/26; G06V 10/80; G06V 20/68;
G06V 40/10
USPC ................................. 382/141, 110, 154, 181
See application file for complete search history.

(56) References Cited

OTHER PUBLICATIONS

Dai Ting, Zhang Miao and Zhang De Xian, "On the intelligent
detection of insects in stored grain," Proceedings of 2011 International Conference on Electronic & Mechanical Engineering and
Information Technology, Harbin, China, 2011, pp. 2427-2430, (Year:
2011).*
Toews et al, "Imaging and Automated Detection of Sitophilus
oryzae (Coleoptera: Curculionidae) Pupae in Hard Red Winter
Wheat", May 2006, Journal of Economic Entomology, pp. 583-598
(Year: 2006).*

* cited by examiner

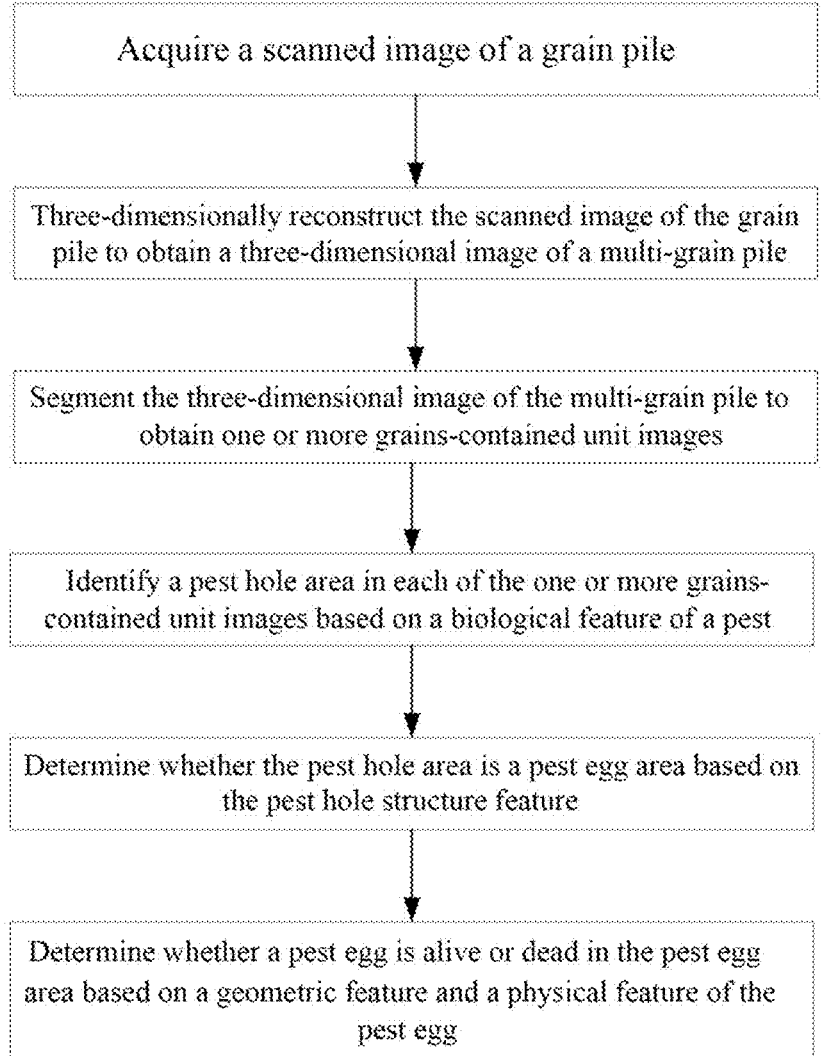

Acquire a scanned image of a grain pile

Three-dimensionally reconstruct the scanned image of the grain pile to obtain a three-dimensional image of a multi-grain pile Segment the three-dimensional image of the multi-grain pile to obtain one or more grains-contained unit images Identify a pest hole area in each of the one or more grains-contained unit images based on a biological feature of a pest Determine whether the pest hole area is a pest egg area based on the pest hole structure feature Determine whether a pest egg is alive or dead in the pest egg area based on a geometric feature and a physical feature of the pest egg

METHOD, DEVICE, SYSTEM AND COMPUTER READABLE MEDIUM FOR RAPIDLY DETECTING PEST EGG IN GRAIN BASED ON PEST EGG AND PEST HOLE STRUCTURE FEATURES

CROSS-REFERENCE TO RELATED APPLICATIONS

This application claims priority to Chinese Patent Application No. 202210775843.3, filed on Jul. 3, 2022, which is hereby incorporated by reference in its entirety.

TECHNICAL FIELD

The present disclosure relates to the technical field of grain food quality and safety detection, in particular to a method, device, system and computer-readable medium for rapidly detecting a pest egg in a grain based on pest egg and pest hole structure features.

BACKGROUND

According to survey statistics, the annual comprehensive loss of global food caused by pest infestation can reach 8%-10%, resulting in huge economic losses. Pests such as maize weevil and rice weevil infest stored grain crops and lay eggs in grains, such as wheat, rice, sorghum, corn, peanut, soybean, broad bean and other grain crops, and the entire growth process of the eggs is completed in grains. The eggs hatch into larvae and erode the grains continuously during their growth and development. However, this whole process cannot be detected by naked eye and erode, thereby posing a great threat to grain storage safety.

At present, with the help of high-resolution X-ray two-dimensional imaging and image processing technology, it is possible to identify the larval, pupal and adult stages of pests in grains, but early detection of pests still relies on human experience, resulting in low detection efficiency and detection accuracy. More importantly, it is difficult to detect eggs of the pests. Pest eggs have concealment and strong vitality, which constitutes a potential hazard to the grains for a long time. Rapid detection of pest eggs has become a technical problem to be solved in the current industry.

SUMMARY

According to a first aspect of the present disclosure, there is provided a method for rapidly detecting of a pest egg in a grain based on a pest egg structure feature and a pest hole structure feature, comprising:

Step 1: acquiring a scanned image of a grain pile, wherein the scanned image of the grain pile includes a plurality of gray digital images;

Step 2: three-dimensionally reconstructing on the scanned image of the grain pile to obtain a three-dimensional image of a multi-grain pile;

Step 3: segmenting the three-dimensional image of the multi-grain pile to obtain one or more grains-contained unit images;

Step 4: identifying a pest hole area in each of the one or more grains contained unit images based on a biological feature of a pest;

Step 5: determining whether the pest hole area is a pest egg area based on the pest hole structure feature; and

Step 6: determining whether an alive pest egg exists in the pest egg area based on a geometric feature and a physical feature of the pest egg.

According to a second aspect of the present disclosure, a device for rapidly detecting of a pest egg in a grain based on a pest egg structure and a pest hole structure feature is also provided, the device includes:

an image acquisition module configured to acquire a scanned image of a grain pile;

a three-dimensional reconstruction module configured to three-dimensionally reconstruct the scanned image of the grain pile to obtain three-dimensional images of a multi-grain pile;

an image segmentation module configured to segment the three-dimensional image of the multi-grain piles to obtain one or more grains-contained unit images;

a pest hole area identification module configured to a pest hole area in each of one or more grains-contained unit images based on a pest biological feature of a pest;

a pest egg area determination module configured to determine whether the pest hole area is a pest egg area based on the pest hole structure feature; and a pest egg determination module configured to determine whether an alive pest egg exists in the pest egg area based on a geometric feature and a physical feature of the pest egg.

According to a third aspect of the present disclosure, a system for rapidly detecting a pest egg in a grain based on a pest egg structure feature and a pest hole structure feature is also provided, the system includes:

one or more processors;

a memory for storing executable instructions that, when executed by the one or more processors, cause the one or more processors to perform operations comprising a process of performing the aforementioned method.

According to a fourth aspect of the present disclosure, a computer-readable medium is also provided for storing software comprising instructions executable by one or more computers, wherein the instructions include a process of performing the aforementioned method.

BRIEF DESCRIPTION OF THE DRAWINGS

The drawings are not intended to be drawn to scale. In the drawings, each identical or nearly identical component shown in various figures may be denoted by the same reference numerals. For clarity, not every component is labeled in every figure. Embodiments of various aspects of the present disclosure will now be described by way of example and with reference to the accompanying drawings:

FIG. 2 is a schematic flowchart of a method for rapidly detecting a pest egg in a grain according to an embodiment of the present disclosure.

DETAILED DESCRIPTION OF THE EMBODIMENTS

In order to better understand the technical contents of the present disclosure, specific embodiments are described below with reference to the accompanying drawings.

Aspects of the present disclosure are described in the present disclosure with reference to the accompanying drawings, in which a number of illustrative embodiments are shown. Embodiments of the present disclosure are not necessarily intended to include all aspects of the present disclosure. It should be understood that various concepts and embodiments described above, as well as those described in greater detail below, can be implemented in any of a number of ways, as the concepts and embodiments disclosed herein do not limited to any implementation. Additionally, some aspects of the present disclosure may be used alone or in any suitable combination with other aspects of the present disclosure.

Figure 1:
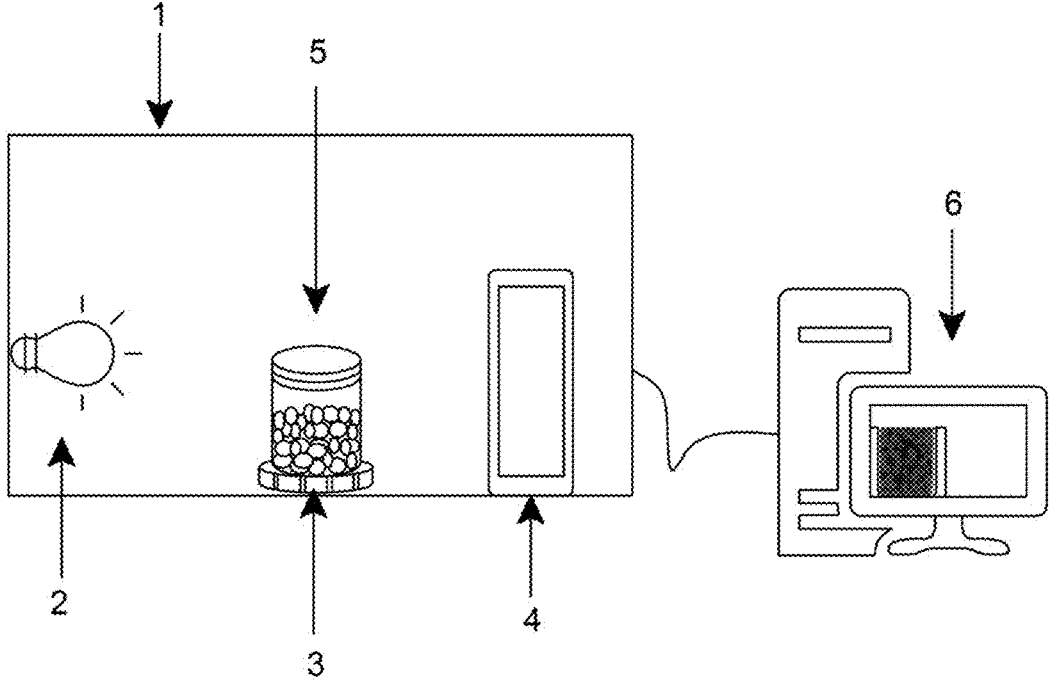
FIG. 1 is a schematic diagram of a rapid scanning detection system for a pest egg in a grain according to an embodiment of the present disclosure.

In combination with the exemplary embodiment shown in FIGS. 1 and 2, a rapid scanning detection system for a pest egg in a grain includes a scanner 1, a radiation source 2, a sample stage 3, a detector 4 and a computer system 6.

Samples 5 to be tested are filled in a cylindrical container and placed on the sample stage 3. A beam emitted by the radiation source 2 penetrates the sample and is received by the detector 4. The detector 4 communicates with the computer system 6, and sends digital signals of a scanned image to the computer system 6. The computer system 6 performs image processing and analysis to realize identification and detection of pest eggs in grains, and displays a detection process or results on the display screen of the computer system 6 in real time.

In an alternative embodiment, the samples 5 to be tested may be granular grain crops such as wheat, rice, sorghum, corn, peanut, soybean, broad bean, and the like.

In the following examples, wheat is taken as an example to illustrate the identification and detection process of pest eggs in grains.

As shown in FIG. 2, a process of a rapid detection method for a pest egg in a wheat grain is exemplarily shown, including the following steps 1 to 6.

In step 1, a scanned image of a grain pile is acquired, where the scanned image of the grain pile includes a plurality of gray digital images.

In step 2, the scanned image of the grain pile is three-dimensionally reconstructed to obtain a three-dimensional image of the multi-grain pile.

In step 3, the three-dimensional image of the multi-grain pile is segmented to obtain one or more grains-contained unit images.

In step 4, a pest hole area in each of the one or more grains-contained unit images is identified based on a biological feature of a pest.

In step 5, it is determined whether the pest hole area is a pest egg area or not based on the pest hole structure feature.

In step 6, it is determined whether an alive pest egg exists in the pest egg area or not based on a geometric feature and a physical feature of the pest egg.

In the embodiment of the present disclosure, a scanned image of wheat pile can be based on electronic computed tomography (e.g., X-ray-based CT scanning) technology, to obtain cross-sectional scanning gray digital images of the wheat to be detected in the container. On this basis, the scanned image can be three-dimensionally reconstructed to obtain a three-dimensional image of multi-grain wheat pile.

It should be understood that before scanning, the sample to be tested is cleaned and then loaded. Specifically, impurities doped in the wheat are cleaned with a sieve, and the infested wheats are taken out and filled in a cylindrical container.

In an optional embodiment, the process of three-dimensional reconstruction can be completed based on corresponding software processing of a CT scanning instrument.

In the embodiment of the present disclosure, 20 g of the infested grains were taken and placed in a glass cylinder with an inner diameter of 3 cm for testing, and then placed on the sample stage 3 to wait for detection.

A flat-panel detector is used for CT scanning imaging, and the detector's own software is used for data acquisition to obtain a data set of digital gray images of grain piles, which is subjected to reconstruction, to obtain a three-dimensional image, the voxel size of the image is 15 microns.

Due to large size of three-dimensional image data obtained through scanning the grain pile, such data information, in case of being analyzed directly, would place very high demands on the hardware and software of a processor, and the analysis efficiency and accuracy of the processor would be affected. Therefore, in the embodiment of the present disclosure, the segmented one or more grains-contained unit images are used for data analysis, which will greatly improve processing speed and accuracy.

In an optional embodiment, a threshold or watershed segmentation algorithm may be used to segment the three-dimensional image of a multi-grain pile to obtain one or more grains-contained unit images.

In another embodiment, other object segmentation algorithms such as clustering (e.g. K-means)-based segmentation, graph theory-based segmentation and other segmentation algorithms may also be used for image segmentation to obtain one or more grains-contained unit images.

In an embodiment of the present disclosure, identifying a pest hole area in each of the one or more grains-contained unit images based on the biological features of the pests includes:

according to spherical or quasi-spherical hollow space in the gray image, determining whether the hollow hole space is located in a superficial layer below the surface of the single grain and is in a closed state; if yes, determining the hollow hole space as a pest hole area, and if no, determining the hollow hole space as a non-pest hole area.

For the grain food crops such as wheat, rice, sorghum, corn, peanuts, soybeans, and broad beans which are susceptible to pest infestation, stored grain pests such as maize weevil and rice weevil not only feed on stored grain crops, but also lay eggs inside the grains, resulting in subsequent continuous infestation, and further, such stored grain pests will fill up and close an opening of the pest egg hole after laying eggs. Such biological behavior features make it difficult to determine and identify pest infestation of grain crops and in turn kill the pest, and cause errors in determination performed by grain storage institutions and operators through using the existing detection methods such as dyeing. Such existing methods can only identify the holes and pits formed on the surface of bitten grains, but fail to effectively identify internal pest eggs. However, the pest eggs will hatch and erode the grain continuously in the process of growth and development, which has concealment and strong vitality, constitutes potential risk for a long time, causes long-term and continuous grain loss, and poses a great threat to the safety of grain storage.

Therefore, in the embodiment of the present disclosure, a three-dimensional reconstruction is performed based on the computed tomography to reconstruct a three-dimensional image of the wheat pile, thereby gain insight into internal features of the grains.

Figure 3:
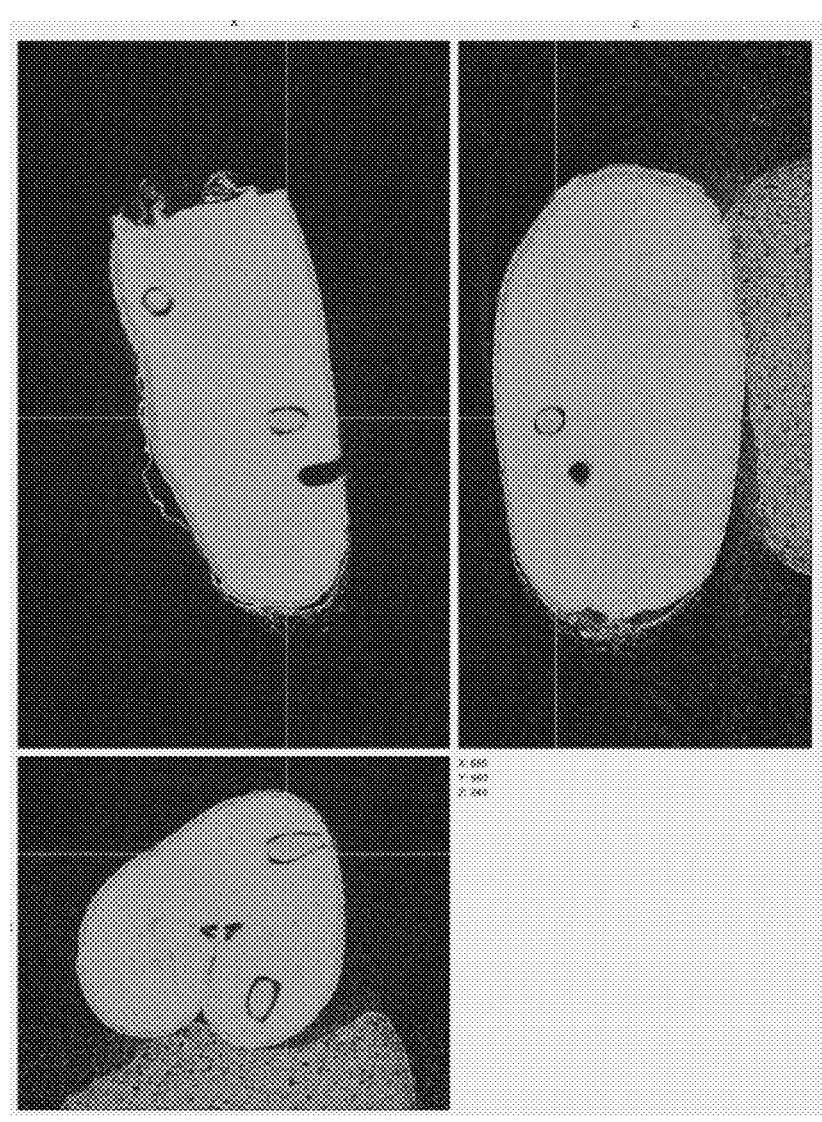
FIG. 3 is a schematic diagram of positions of the pest egg detected by the detection method according to the embodiment of FIG. 2 of the present disclosure.

Combined with biological features of egg laid by stored grain pests, parts where pest eggs exist is searched for in the three-dimensional space of the segmented grains, to identify the hollow hole space that is spherical or quasi-spherical, and locate the coordinate position of the hollow holes pace in the single grain. Then, it is determined whether the hollow hole space is located in the superficial layer below the surface of a single grain, and is closed at its two ends, so as to determine the hollow hole space as the pest hole area; otherwise, the hollow hole space is determined as a non-pest hole area, such as a bitten surface, a bump-caused broken surface. As shown in FIG. 3, the location of the pest hole area is usually close to the grain surface.

In some embodiments, in combination with experiments about the egg depth laid by corn weevil in wheat, for example, the shortest distance from the pest egg center to the wheat surface is defined as $D_1$, and the furthest distance from the egg hole to the wheat surface is defined as $D_2$. According to the three-dimensionally shaped three-dimensional image, we extract the three-dimensional coordinates of the opening of the hole on the surface of wheat, the centroid of the pest egg, and the seal of the pest hole inside the wheat. The values of $D_1$ and $D_2$ are calculated by using the following formula about a distance between two points in space. In order to more clearly express the distance of the pest egg and egg hole from the surface of the wheat, a plurality of eggs and pest holes (for example, preferably 5-10) are selected for the experiments:

$$D=\sqrt{(x_1-x_2)^2+(y_1-y_2)^2+(z_1-z_2)^2},$$

where, D represents the distance between two points in space, and x, y, and z represent the x-axis, y-axis, and z-axis values of measured points in space, respectively.

Through the study on the living habit characteristics of maize weevil in the wheat grains at different growth stages, it is found that maize weevil lays eggs in the grain, and the egg hole can accommodate just one egg, and it can be obtained that the shortest distance $D_1$ from the center of the egg to the surface of the wheat is 0.34±0.04 mm, and the furthest distance $D_2$ from the egg hole to the surface of the wheat is 0.67±0.07 mm. Based on the identification and selection of the depth features of the superficial layer position, the hole positions presented in the superficial layer and falling within a specific depth range below the surface of the grain is identified as the area where pest eggs may exist, that is, the pest hole area.

For the identified pest hole area, whether the pest hole structure contains pest eggs, the state of the hollow hole bitted by stored grain pests, or the state of debris filling in the bitted hollow hole, is further determined, so as to accurately identify the state of the pest eggs in grains.

In some embodiments, determining whether the pest hole area is a pest egg area based on pest hole structure features includes:

according to a step change of gray level in the pest hole area, determining whether the pest hole area is a pest egg area.

The pest egg is located in the pest hole, and the pest hole is not completely filled by the pest egg, with a gap therebetween. With a wheat grain as an example, the area containing a pest egg is a special area of "high-density wheat, low-density air, and high-density pest eggs", and is shown as a sharp contrast area of a "dark-bright-dark" or "bright-dark-bright" mode in the gray image.

Density is a measure of mass in a specific volume, and reflects properties of matter itself. In the embodiment of the present disclosure, according to the principle of CT scanning imaging, the grayscale values represent different X-ray absorption rates of X-rays by objects, mainly due to different densities of the objects. For wheat grain samples in the same scan, different image gray levels are mainly caused by different densities of the objects.

Therefore, in the embodiment of the present disclosure, determining whether the pest hole area is a pest egg area according to the step change of gray level in the pest hole area, includes:

if the gray level in the pest hole area shows a high-low-high step change mode, or a low-high-low step change mode, determining the pest hole area as a pest egg area; and if the gray level in the pest hole area is single, determining the pest hole area as a bitted hole.

Figure 4:
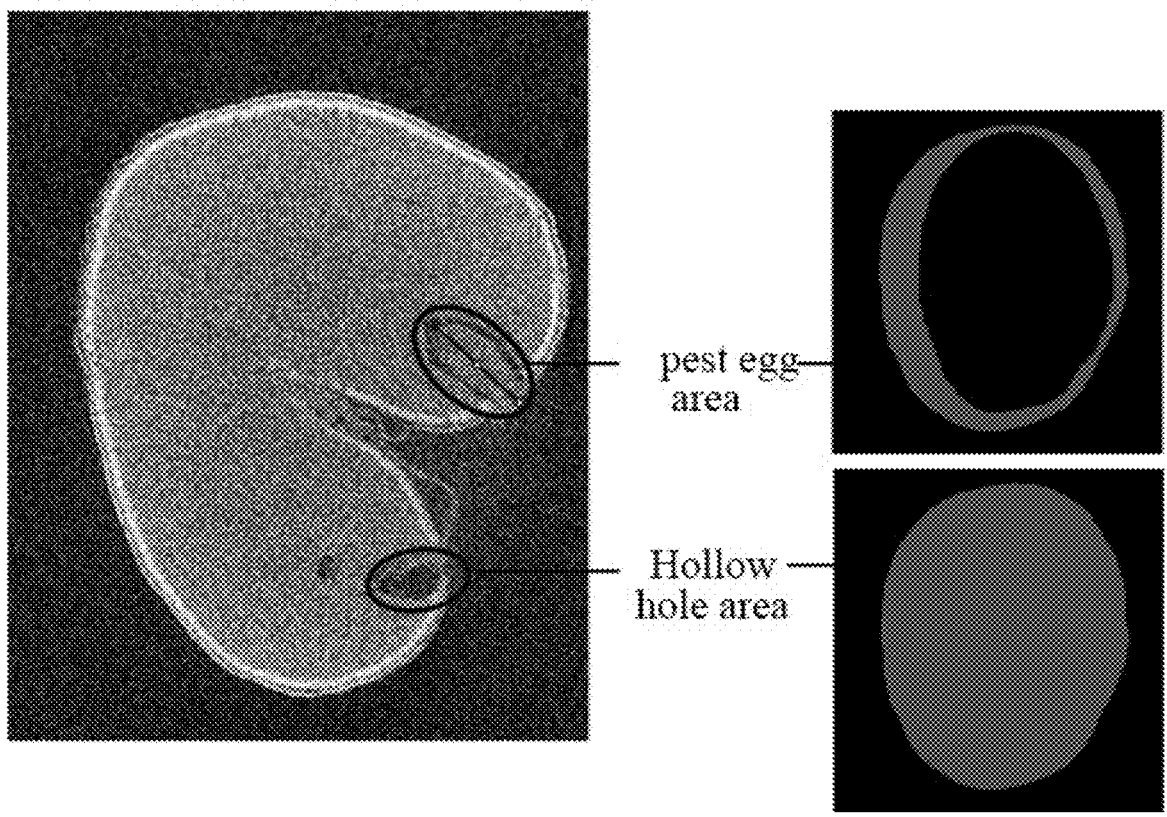
FIG. 4 is a schematic diagram of a two-dimensional image of a wheat grain containing a pest egg and feature structure of the pest egg detected by the detection method according to the embodiment of FIG. 2 of the present disclosure.

As shown in FIG. 4, the pest egg in the wheat is close to the surface of grain, has a clear outline with a clear gap between the pest eggs and the surrounding wheat, and thus is easy to be determined and distinguished. In this case, the grayscale image shows apparent contrasts "dark-light-dark" or "bright-dark-bright", while a simple bitted hollow hole shows a uniform brightness. Thus, the pest egg area (the area where there may be pest eggs) and the bitted hollow hole (the hollow hole bitten by the stored grain pests) are distinguished and determined based on the brightness on the gray image (gray step change mode).

The pest egg hatch and erodes the grain continuously during its growth and development, but the dead pest egg does not further damage the stored grain. In the process of detecting the pest egg in the actual stored grain, only the pest egg which is still alive is intend to be detected and counted, and thus the present disclosure put forward the determination of whether the pest egg is alive or dead.

In an embodiment of the present disclosure, determining whether there is an alive pest egg in the pest egg area based on the geometric feature and physical feature of the pest egg includes:

based on the geometric feature and physical feature of the pest egg, determining whether there is the pest egg in the pest egg area and survival state of the pest egg.

The geometric feature of the pest egg include length, width, height, specific surface area, volume and sphericity features of the pest egg, which constitute morphological features.

The physical features include density feature of the pest egg.

In an optional embodiment, determining whether there is the pest egg in the pest egg area and the survival state of the egg based on the geometric feature and physical feature of the pest egg includes:

based on the fact that the length, width, height, volume features and physical feature of the pest egg are all within a predetermined range of a pest egg model, determining that there is an alive pest egg in the pest egg area, otherwise determining that there is a dead pest egg or the pest egg area is a debris-filled hollow hole.

As shown in FIG. 4, with the wheat grains infested by pests as an example, the length, width, height and volume features of a single wheat grain obtained by segmenting the 3D-reconstructed three-dimensional image segmentation can be obtained by image processing and calculation.

For example, the geometric feature of length, width and height can be obtained based on a minimum bounding rectangle, threshold-based pixel calculation, ellipse fitting, etc. The specific surface area, volume and sphericity of quasi-spheroid can be further calculated based on the geometric features of length, width and height, thus obtaining the morphological feature of the pest egg.

For example, with the grain infested with maize weevil as an example, a predetermined number N (N greater than or equal to 100) of infested wheat grains are randomly sampled, and an pest egg model, that is, the feature value ranges of the pest egg length, width, height (that is, thickness), specific surface area, volume and sphericity, is established by calculating the morphological feature of the pest egg. Further, the accuracy of the characteristic value ranges for the pest egg is verified by using a verification set of 2N wheat grains.

The following table shows the feature value ranges of the pest egg of maize weevil established by the method according to the embodiment of the present disclosure where, $\rho$ represents density; M represents mass; V represents volume.

According to the principle of CT scan imaging, grayscale values represent different X-ray absorption rates of X-rays by objects, mainly due to different densities of the objects. For the same scanned sample, the different image gray levels are mainly caused by different densities of objects.

The linear relationship between gray level and density is shown in the following formula, and the density of the pest egg is calculated according to the formula. The main physical parameters that affect the density of the object are pressure and temperature, and air density is apparently affected by pressure and temperature.

$$\left(\frac{\rho_1 - \rho_2}{G_1 - G_2}\right) = \left(\frac{\rho_1 - \rho_3}{G_1 - G_3}\right)$$

where $\rho_1$, $\rho_2$, $\rho_3$ represent a air density, a grain density, and a pest egg density, respectively; $G_1$, $G_2$, and $G_3$ represent an air grayscale value, a grain grayscale value, and a pest egg grayscale value, respectively.

| Pest eggs | Length/ mm | Width/ mm | Thickness/ mm | Specific Surface Area/mm$^2$ | Volume/ mm$^3$ | Sphericity |
|---|---|---|---|---|---|---|
| Value range | 0.51~0.68 | 0.25~0.29 | 0.22~0.26 | 0.37~0.52 | 0.02~0.03 | 0.78~0.93 |
| Mean ± standard error | 0.61 ± 0.06 | 0.27 ± 0.01 | 0.25 ± 0.02 | 0.44 ± 0.05 | 0.02 ± 0.00 | 0.84 ± 0.04 |

In the embodiment of the present disclosure, if the pest egg area is bitten by pest to form a hollow hole but no egg is laid therein, the interior of the pest egg area may be filled with debris to form a spherical or quasi-spherical egg-like structure. However, in terms of geometry and biological features of the pest egg, such debris-filled spheroid is not formed with growth of the pest egg, but by randomly and loosely filling debris, and its compactness (characterized by density) and sphericity are far from the pest egg structure formed with development of the actual pest egg. Therefore, even if its length, width, height, specific surface area, and volume all meet the feature value range, anomalies can be determined and eliminated through the sphericity and density features of the pest egg, such as determination of filling debris.

After the pest egg is inactivated and dies, it loses water and gradually shrinks; at the same time, the pest egg itself undergoes some changes such as reduction in density and size, and the density is quite different from that of the alive pest egg. Therefore, in the actual detection, it can be determined whether the pest egg area belongs to an area with an alive pest egg or a dead pest egg based on comparison among density features of the pest eggs.

Density is a measure of mass in a specific volume and is a reflection of the properties of matter itself. Density is usually determined based on a ratio of mass to volume. The mass of an object can be obtained by an analytical balance, for example a single grain or a plurality of grains are weighed. In an alternative embodiment, the volume of an irregular object can be determined using a drainage method.

In the embodiment of the present disclosure, the volume of the grain is calculated by the three-dimensional visualization method after CT scan imaging and reconstruction.

The density of the grain is calculated by the density formula:

Density $\rho=M/V$;

The grain density $\rho_2$ is calculated based on M/V, where M is mass of the grain, and V is volume of the grain.

The aforementioned air density $\rho_1$ is determined based on the local altitude and room temperature of a test area.

During CT scanning, the temperature of the sample itself is affected by the radiation of power supply, and the temperature of the air inside the sample also changes accordingly, and surrounding air around the sample is also affected during the irradiation process. Therefore, in order to ensure reliability of test results, for the grayscale value of the air, points are taken from a hole around the pest egg in the wheat.

The grayscale value of 16-bit image ranges from 0 to 65535.

The three-dimensional image file reconstructed by CT is read through software like Avizo, and grayscale value of the image is also read. 30 points are randomly selected from the scanned sample as representative sample points, and their grayscale values are recorded and averaged.

The grayscale values $G_1$, $G_2$ and $G_3$ of the air, grain and pest egg are obtained as follows:

reading the grayscale values of the gray image, randomly selecting the grayscale values of several points in an image area between the pest egg and the grain in the pest egg area and calculating an average value of the grayscale values as the air grayscale value $G_1$; randomly selected the grayscale values of several points in a partial image area corresponding to the non-pest hole area of the grain and calculating an average value of the grayscale values as the wheat grayscale value $G_2$; and randomly selecting the grayscale values of several points in an image area corresponding to interior of the pest egg in the pest egg area and calculating an average value of the grayscale values as the pest egg grayscale value $G_3$.

As a preferred way, the selected several points may be representative points, the number is limited within 20-50 points, and the numbers of selected points for $G_1$, $G_2$, and $G_3$ is identical, for example, the grayscale values of 30 points are selected for calculating the average value.

Accordingly, the density feature value of the pest egg can be estimated. Furthermore, based on the density feature value, it can be determined whether the pest egg area belongs to an area with debris filled or an area with dead pest egg, and it is eliminated, so that the real alive pest eggs can be further judged.

In a further embodiment, the method according to the present disclosure further includes:

counting pest eggs in grains per unit mass is counted, to obtain the number of pest eggs in grains per unit mass, so that the risk of grain suffering from pest infestation can be further determined, and the infestation level of grain by pests can be determined, to facilitate formulating corresponding pest control plan and subsequent storage strategy.

Figure 5:
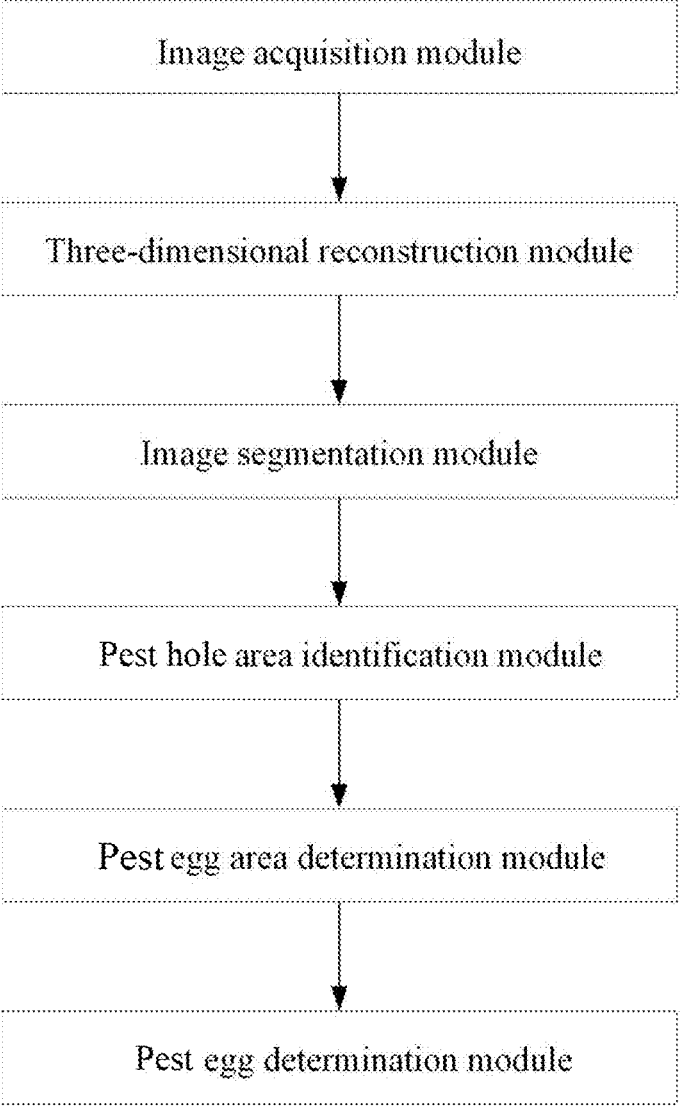
FIG. 5 is a schematic diagram of a principle of functional modules in a device for rapidly detecting a pest egg in a grain based on pest egg and pest hole structure features according to an embodiment of the present disclosure.

As shown in FIG. 5, according to an embodiment of the present disclosure, a device for rapidly detecting a pest egg in a grain based on pest egg and pest hole structure feature is also provided, the device includes the following modules:

an image acquisition module, configured to acquire scanned images of a grain pile;

a three-dimensional reconstruction module, configured to three-dimensionally reconstruct the scanned images of the grain pile to obtain a three-dimensional image of a multi-grain pile;

an image segmentation module configured to segment the three-dimensional images of the multi-grain pile to obtain one or more grains-contained unit images;

a pest hole area identification module, configured to identify a pest hole area in each of one or more grains-contained unit images based on a biological feature of a pest;

a pest egg area identification module, configured to determine whether the pest hole area is a pest egg area based on the pest hole structure feature; and a pest egg identification module, configured to determine whether there is an alive pest egg in the pest egg area based on geometric and physical features of the pest egg.

The methods of the foregoing embodiments of the present disclosure, especially the flow of the embodiment shown in FIG. 2, can be configured to be implemented in a computing system with data interface, data storage, and data processing functions. The computing system includes hardware, system software and functional software implementation deployed in the hardware system. The process of the aforementioned method for rapidly detecting a pest egg in a grain can be configured to be integrated into a function software in the form of a computer instruction set, and can be executed by a computing system to realize the process of rapidly detecting a pest egg in a grain.

In some embodiments, the aforementioned computing system may be a handheld electronic device, a portable laptop computer system, a desktop computer system, a server system, and the like.

Figure 6:
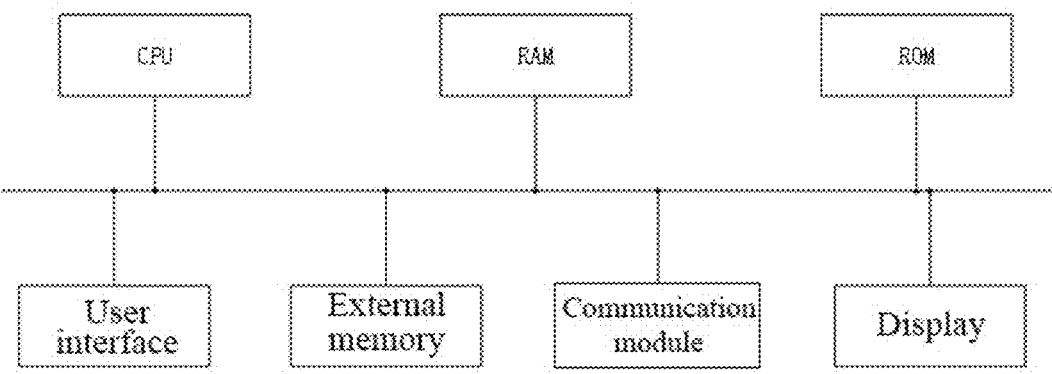
FIG. 6 is a schematic diagram of a computer system according to an embodiment of the present disclosure.

With the computer system shown in FIG. 6 as an example, it may include a CPU (central processing unit), a ROM (read-only memory), a RAM (random-access memory), a user interface, a communication module and a display. These components/modules are connected to each other via a bus, and are arranged in a board or an integrated circuit in an integrated or independent manner.

The communication module may optionally be a wired or wireless communication module, such as 4G, 5G and other wireless network communication modules.

The CPU, ROM, and RAM implement various functions with software by reading and executing instruction sets, such as recorded system software or functional software. In embodiments of the present disclosure, the control of the rapid detection process of the pest egg in the grain can be implemented, for example, by a combination of CPU, ROM, and RAM.

The user interaction interface may be an input device for receiving user operations, such as a touch panel, virtual keys, keyboard and mouse input devices, and the like.

The display is constituted by a device capable of visually informing the user of information. For example, the display may be an LCD (liquid crystal display) or LED (light-emitting diode) display device. The display outputs the results of data processing performed by the CPU, ROM, and RAM and displays the results to the user.

It should be understood that each of the above-described constituent elements may be constructed by using general-purpose components, or may be constructed by hardware dedicated to the function of each constituent element. This configuration can be appropriately changed during implementation.

According to the disclosed embodiments of the present disclosure, a rapid detection system for a pest egg in a grain based on pest egg and pest hole structure features includes:

one or more processors;

a memory for storing executable instructions that, when executed by the one or more processors, cause the one or more processors to perform operations comprising a process of performing the aforementioned method.

A computer-readable medium according to embodiments of the present disclosure is configured to store software, the software includes instructions executable by one or more computers, and the operations include processes of performing the aforementioned methods.

Although the present disclosure has been disclosed above with preferred embodiments, it is not intended to limit the present disclosure. Those skilled in the art to which the present disclosure belongs can make various changes and modifications without departing from the spirit and scope of the present disclosure. Therefore, the protection scope of the present disclosure should be defined according to the claims.

What is claimed is:

1. A method for rapidly detecting a pest egg in a grain based on a pest egg structure feature and a pest hole structure feature, comprising:

acquiring a scanned image of a grain pile, wherein the scanned image of the grain pile comprises a plurality of gray digital images;

three-dimensionally reconstructing the scanned image of the grain pile to obtain a three- dimensional image of a multi-grain pile;

segmenting the three-dimensional image of the multi-grain pile to obtain one or more grains- contained unit images;

identifying a pest hole area in each of the one or more grains-contained unit images based on a biological feature of a pest;

determining whether the pest hole area is a pest egg area based on the pest hole structure feature; and determining whether a pest egg is alive or dead in the pest egg area based on a geometric feature and a physical feature of the pest egg.

2. The method according to claim 1, wherein the identifying the pest hole area in each of the one or more grains-contained unit image based on a biological feature of a pest comprises:

based on spherical or quasi-spherical hollow hole space in the gray images, determining whether the hollow space is located in a superficial layer below a surface of a single grain and is in a closed state, wherein if the hollow space is located in the superficial layer below the surface of the single grain and is in the closed state, the hollow space is determined as the pest hole area, and if the hollow space is not located in the superficial layer below the surface of the single grain and is in the closed state, the hollow space is determined as a non-pest hole area.

3. The method according to claim 1, wherein determining whether the pest hole area is the pest egg area based on the pest hole structure feature comprises:

determining whether the pest hole area is the pest egg area based on step change of gray level in the pest hole area.

4. The method according to claim 3, wherein the determining whether the pest hole area is the pest egg area based on step change of gray level in the pest hole area comprises:

if the gray level in the pest hole area shows a high-low-high step change mode, or a low-high- low step change mode, determining the pest hole area as the pest egg area, and if the gray level in the pest hole area is single, determining the pest hole as a bitted hollow hole.

5. The method according to claim 1, wherein determining whether the pest egg is alive or dead in the pest egg area based on the geometric feature and the physical feature of the pest egg comprises:

determining whether the pest egg exists in the pest egg area and a survival state of the pest egg based on the geometric feature and the physical feature of the pest egg;

wherein the geometric feature of the pest egg comprise length, width, height, specific surface area, volume and sphericity features of the pest egg, and wherein the physical feature comprises density feature of the pest egg.

6. The method according to claim 5, wherein determining whether the pest egg exists in the pest egg area and a survival state of the pest egg based on the geometric feature and physical feature of the pest egg comprises:

based on the fact that the length, width, height, volume, specific surface area, sphericity features and physical feature of the pest egg are within a predetermined range of a pest egg model, determining that an alive pest egg exists in the pest egg area, otherwise determining that the pest egg area contains a dead egg or is a debris-filled hollow hole.

7. The method according to claim 5, wherein the density feature of the pest egg is set to be estimated based on linear relationship between grayscale values of the gray images and density, and the linear relationship is expressed as:

$$\left(\frac{\rho_1 - \rho_2}{G_1 - G_2}\right) = \left(\frac{\rho_1 - \rho_3}{G_1 - G_3}\right)$$

where $\rho_1$, $\rho_2$, $\rho_3$ represent an air density, a grain density, and a pest egg density, respectively; $G_1$, $G_2$, and $G_3$ represent an air grayscale value, a grain grayscale value, and a pest egg grayscale value, respectively;

the grain density $\rho_2$ is calculated based on M/V, where M is a mass of the grain, and V is a volume of the grain;

the air density $\rho_1$ is determined based on an altitude and a temperature of a test area;

the air grayscale values $G_1$, the grain air grayscale value $G_2$ and the pest egg grayscale value $G_3$ are calculated as follows:

reading the grayscale values of the gray images, randomly selecting grayscale values of several points in a first image area between the pest egg and the grain in the pest egg area and computing an average of the grayscale values in the first image area as the air grayscale value $G_1$, randomly selecting grayscale values of several points in a second image area corresponding to a non-pest hole area of the grain and computing an average of the grayscale values in the second image area as the grain grayscale value $G_2$, randomly selecting grayscale values of several points in a third image area corresponding to an interior of the pest egg in the pest egg area and computing an average of the grayscale values in the third image area as the pest egg grayscale value $G_3$.

8. The method according to claim 6, wherein the density feature of the pest egg is set to be estimated based on linear relationship between grayscale values of the gray images and density, and the linear relationship is expressed as:

$$\left(\frac{\rho_1 - \rho_2}{G_1 - G_2}\right) = \left(\frac{\rho_1 - \rho_3}{G_1 - G_3}\right)$$

where $\rho_1$, $\rho_2$, $\rho_3$ represent an air density, a grain density, and a pest egg density, respectively; $G_1$, $G_2$, and $G_3$ represent an air grayscale value, a grain grayscale value, and a pest egg grayscale value, respectively;

the grain density $\rho_2$ is calculated based on M/V, where M is a mass of the grain, and V is a volume of the grain;

the air density $\rho_1$ is determined based on an altitude and a temperature of a test area;

the air grayscale values $G_1$, the grain grayscale value $G_2$ and the pest egg grayscale value $G_3$ are calculated as follows:

reading the grayscale values of the gray images, randomly selecting grayscale values of several points in a first image area between the pest egg and the grain in the pest egg area and computing an average of the grayscale values in the first image area as the air grayscale value $G_1$, randomly selecting grayscale values of several points in a second image area corresponding to a non-pest hole area of the grain and computing an average of the grayscale values in the second image area as the grayscale value $G_2$, randomly selecting grayscale values of several points in a third image area corresponding to an interior of the pest egg in the pest egg area and computing an average of the grayscale values in the third image area as the pest egg grayscale value $G_3$.

9. A system for rapidly detecting a pest egg in a grain based on a pest egg structure feature and a pest hole structure feature, comprising:

one or more processors;

a memory for storing executable instructions that, when executed by the one or more processors, cause the one or more processors to perform operations comprising a process of performing the method of claim 1.

10. The system according to claim 9, wherein identifying the pest hole area in each of the one or more grains-contained unit image based on a biological feature of a pest comprises:

based on spherical or quasi-spherical hollow hole space in the gray images, determining whether the hollow space is located in a superficial layer below a surface of a single grain and is in a closed state, wherein if the hollow space is located in the superficial layer below the surface of the single grain and is in the closed state, the hollow space is determined as the pest hole area, and if the hollow space is not located in the superficial layer below the surface of the single grain and is in the closed state, the hollow space is determined as a non-pest hole area.

11. The system according to claim 9, wherein determining whether the pest hole area is the pest egg area based on the pest hole structure feature comprises:

determining whether the pest hole area is the pest egg area based on step change of gray level in the pest hole area.

12. The system according to claim 11, wherein determining whether the pest hole area is the pest egg area based on step change of gray level in the pest hole area comprises:

if the gray level in the pest hole area shows a high-low-high step change mode, or a low-high- low step change mode, determining the pest hole area as the pest egg area, and if the gray level in the pest hole area is single, determining the pest hole as a bitted hollow hole.

13. The system according to claim 9, wherein determining whether the pest egg is alive or dead in the pest egg area based on the geometric feature and the physical feature of the pest egg comprises:

determining whether the pest egg exists in the pest egg area and a survival state of the pest egg based on the geometric feature and the physical feature of the pest egg;

wherein the geometric feature of the pest egg comprise length, width, height, specific surface area, volume and sphericity features of the pest egg, and wherein the physical feature comprises density feature of the pest egg.

14. The system according to claim 13, wherein determining whether the pest egg exists in the pest egg area and a survival state of the pest egg based on the geometric feature and physical feature of the pest egg comprises:

based on the fact that the length, width, height, volume, specific surface area, sphericity features and physical feature of the pest egg are within a predetermined range of a pest egg model, determining that an alive pest egg exists in the pest egg area, otherwise determining that the pest egg area contains a dead egg or is a debris-filled hollow hole.

15. The system according to claim 13, wherein the density feature of the pest egg is set to be estimated based on linear relationship between grayscale values of the gray images and density, and the linear relationship is expressed as:

$$\left(\frac{\rho_1 - \rho_2}{G_1 - G_2}\right) = \left(\frac{\rho_1 - \rho_3}{G_1 - G_3}\right)$$

where $\rho_1$, $\rho_2$, $\rho_3$ represent an air density, a grain density, and a pest egg density, respectively; $G_1$, $G_2$, and $G_3$ represent an air grayscale value, a grain grayscale value, and a pest egg grayscale value, respectively;

the grain density $\rho_2$ is calculated based on M/V, where M is a mass of the grain, and V is a volume of the grain;

the air density $\rho_1$ is determined based on an altitude and a temperature of a test area;

the air grayscale values $G_1$, the grain air grayscale value $G_2$ and the pest egg grayscale value $G_3$ are calculated as follows:

reading the grayscale values of the gray images, randomly selecting grayscale values of several points in a first image area between the pest egg and the grain in the pest egg area and computing an average of the grayscale values in the first image area as the air grayscale value $G_1$, randomly selecting grayscale values of several points in a second image area corresponding to a non-pest hole area of the grain and computing an average of the grayscale values in the second image area as the grain grayscale value $G_2$, randomly selecting grayscale values of several points in a third image area corresponding to an interior of the pest egg in the pest egg area and computing an average of the grayscale values in the third image area as the pest egg grayscale value $G_3$.

16. The system according to claim 14, wherein the density feature of the pest egg is set to be estimated based on linear relationship between grayscale values of the gray images and density, and the linear relationship is expressed as:

$$\left(\frac{\rho_1 - \rho_2}{G_1 - G_2}\right) = \left(\frac{\rho_1 - \rho_3}{G_1 - G_3}\right)$$

where $\rho_1$, $\rho_2$, $\rho_3$ represent an air density, a grain density, and a pest egg density, respectively; $G_1$, $G_2$, and $G_3$ represent an air grayscale value, a grain grayscale value, and a pest egg grayscale value, respectively;

the grain density $\rho_2$ is calculated based on M/V, where M is a mass of the grain, and V is a volume of the grain;

the air density $\rho_1$ is determined based on an altitude and a temperature of a test area;

the air grayscale values $G_1$, the grain air grayscale value $G_2$ and the pest egg grayscale value $G_3$ are calculated as follows:

reading the grayscale values of the gray images, randomly selecting grayscale values of several points in a first image area between the pest egg and the grain in the pest egg area and computing an average of the grayscale values in the first image area as the air grayscale value $G_1$, randomly selecting grayscale values of several points in a second image area corresponding to a non-pest hole area of the grain and computing an average of the grayscale values in the second image area as the grain grayscale value $G_2$, randomly selecting grayscale values of several points in a third image area corresponding to an interior of the pest egg in the pest egg area and computing an average of the grayscale values in the third image area as the pest egg grayscale value $G_3$.

17. A non-transitory computer-readable medium encoded with a computer program, comprising instructions executable by one or more computers, wherein the instructions comprise a process of performing the method of claim 1.

18. The non-transitory computer-readable medium according to claim 17, wherein identifying the pest hole area in each of the one or more grains-contained unit image based on a biological feature of a pest comprises:

based on spherical or quasi-spherical hollow hole space in the gray images, determining whether the hollow space is located in a superficial layer below a surface of a single grain and is in a closed state, wherein if the hollow space is located in the superficial layer below the surface of the single grain and is in the closed state, the hollow space is determined as the pest hole area, and if the hollow space is not located in the superficial layer below the surface of the single grain and is in the closed state, the hollow space is determined as a non-pest hole area.

19. The non-transitory computer-readable medium according to claim 10, wherein determining whether the pest hole area is the pest egg area based on the pest hole structure feature comprises:

determining whether the pest hole area is the pest egg area based on step change of gray level in the pest hole area.

* * * * *